United States Patent
Sakiyama et al.

(10) Patent No.: US 11,785,929 B2
(45) Date of Patent: Oct. 17, 2023

(54) DUAL-BEARING REEL

(71) Applicant: GLOBERIDE, Inc., Tokyo (JP)

(72) Inventors: Tomoaki Sakiyama, Toyko (JP);
Masayuki Hatakenaka, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 17/539,466

(22) Filed: Dec. 1, 2021

(65) Prior Publication Data

US 2022/0192170 A1    Jun. 23, 2022

(30) Foreign Application Priority Data

Dec. 21, 2020 (JP) ................................. 2020-211349

(51) Int. Cl.
| | | |
|---|---|---|
| *A01K 89/01* | (2006.01) | |
| *A01K 89/033* | (2006.01) | |
| *B65H 75/44* | (2006.01) | |

(52) U.S. Cl.
CPC ....... *A01K 89/046* (2015.05); *B65H 75/4428* (2013.01); *B65H 2701/355* (2013.01)

(58) Field of Classification Search
CPC . A01K 89/004; A01K 89/0192; A01K 89/046
See application file for complete search history.

(56) References Cited

U.S. PATENT DOCUMENTS

| | | | |
|---|---|---|---|
| 4,821,978 A | | 4/1989 | Kaneko |
| 5,183,221 A | * | 2/1993 | Kawai ................. A01K 89/015 242/282 |
| 5,988,548 A | * | 11/1999 | Chapman ........... A01K 89/0192 D22/140 |
| 9,609,855 B2 | | 4/2017 | Hyun |
| 2006/0006267 A1 | * | 1/2006 | Hirayama ........ A01K 89/01928 242/223 |
| 2017/0013818 A1 | * | 1/2017 | Kobayashi ......... A01K 89/0193 |
| 2017/0303520 A1 | * | 10/2017 | Hyun ................... A01K 89/006 |
| 2018/0103627 A1 | * | 4/2018 | Takechi ............... A01K 89/033 |

FOREIGN PATENT DOCUMENTS

| | | | | |
|---|---|---|---|---|
| CN | 106342769 A | | 1/2017 | |
| JP | 2000324984 A | | 11/2000 | |
| JP | 2016-178886 A | | 10/2016 | |
| KR | 20200099064 A | * | 8/2020 | ......... A01K 89/0192 |

OTHER PUBLICATIONS

Office Action for related Taiwan Application No. 110142362; action dated Jun. 8, 2022; (13 pages).

(Continued)

*Primary Examiner* — Emmanuel M Marcelo
(74) *Attorney, Agent, or Firm* — K&L Gates LLP

(57) ABSTRACT

A dual-bearing reel according to the present disclosure enables a rotatably supported spool between a left and a right side panel of a reel body to be rotated with a handle provided at one of the side panels and includes a movement restraining portion that is provided on an outer peripheral surface of a counter handle-side one of the side panels of the reel body, and that prevents a pressing thumb of a hand from moving outward from the counter handle-side one of the side panels.

6 Claims, 7 Drawing Sheets

(56) References Cited

OTHER PUBLICATIONS

Extended European Search Report for related European Application No. 21215539.4; action dated May 19, 2022; (7 pages).
Examination Report for related Australian Application No. 2021277696; action dated Feb. 17, 2023; (4 pages).
First Examination report in connection with related Chinese Patent Application No. 202111347773.3; action dated Jan. 29, 2023; (14 pages).
European Examination Report in connection with EP Patent Application No. 21215539.4; action dated Jun. 12, 2023; (4 pages).
Second Examination Report in connection with Chinese Patent Application No. 202111347773.3; action dated Jul. 19, 2023; (16 pages).

* cited by examiner

C-C

DUAL-BEARING REEL

CROSS-REFERENCE TO RELATED APPLICATIONS

This application claims priority under 35 U.S.C. § 119 to Japanese Patent Application No. 2020-211349 filed on Dec. 21, 2020, in the Japanese Patent Office, the entire contents of each hereby incorporated by reference.

FIELD

The present disclosure relates to a dual-bearing reel and, more particularly, to a dual-bearing reel that provides a better hold for a thumb of a hand holding a counter handle-side side panel of a reel body during winding or jerking.

Among dual-bearing reels each having, between a left and a right side panel of a reel body, a rotatably supported spool that a fishline is wound on, there are dual-bearing reels for use in jerking, jigging which is a strict manipulation involving winding using a handle during jerking, and others. For example, a dual-bearing reel disclosed in Japanese Patent Application Publication No. 2016-178886 ("Patent Literature 1") has a left and a right side panel that are round in shape and enables easier thumbing when jerking is performed with the counter handle-side side panel gripped. This dual-bearing reel has an improvement in relative position of a chamfer of an outer peripheral end of the counter handle-side side panel and an outer peripheral edge surface of a flange of a spool, thus enabling easy shifting from the chamfer to the outer peripheral edge surface. During fishing, smooth thumbing with no sense of discomfort is therefore enabled with a hold on the counter handle-side side panel being sustained.

SUMMARY

The above configuration disclosed in Patent Literature 1 allows a thumb of a holding hand to smoothly shift toward a fishline on the spool. However, jerking during fishing requires that a pad of the thumb of that holding hand give a hard press to an outer periphery of the counter handle-side side panel with a grip end of a fishing rod securely abutted against a forearm for keeping a reel body immobile. When seen from above, the side panel described in Patent Literature 1 is of mere shape to include, on an inner side of its upper surface portion, the chamfer having the same inclination as the flange of the spool for facilitating the shifting from the upper surface portion to the flange of the spool. In other words, outer surface portions other than the chamfer are substantially flat. For this reason, when jerking or the like is performed with the thumb pressing the upper surface portion of the side panel, the pad of the thumb easily slides outward from the outer periphery of the side panel, problematically resulting in no secure hold.

The present disclosure has been made in view of the above problem, and an object of the present disclosure is to provide a dual-bearing reel that provides a better hold on a counter handle-side side panel even during strict jerking such as jigging.

In order to achieve the above object, a dual-bearing reel according to the present disclosure enables a rotatably supported spool between a left and a right side panel of a reel body to be rotated with a handle provided at one of the side panels and includes a movement restraining portion that is provided on an outer peripheral surface of a counter handle-side one of the side panels of the reel body, and that prevents a pressing thumb of a hand from moving outward from the counter handle-side one of the side panels.

When jerking such as jigging is performed with the above dual-bearing reel held together with a fishing rod, the outer peripheral surface of the counter handle-side side panel is held by being pressed by a pad of the thumb. In the meantime, the movement restraining portion provided on the outer peripheral surface of the counter handle-side side panel prevents the pressing thumb of the hand from moving outward from that side panel, thus providing a better hold and enabling a manipulation such as jerking to be stable.

The dual-bearing reel according to the present disclosure provides the better hold on the counter handle-side side panel even during strict jerking such as jigging.

DETAILED DESCRIPTION

Figure 1:
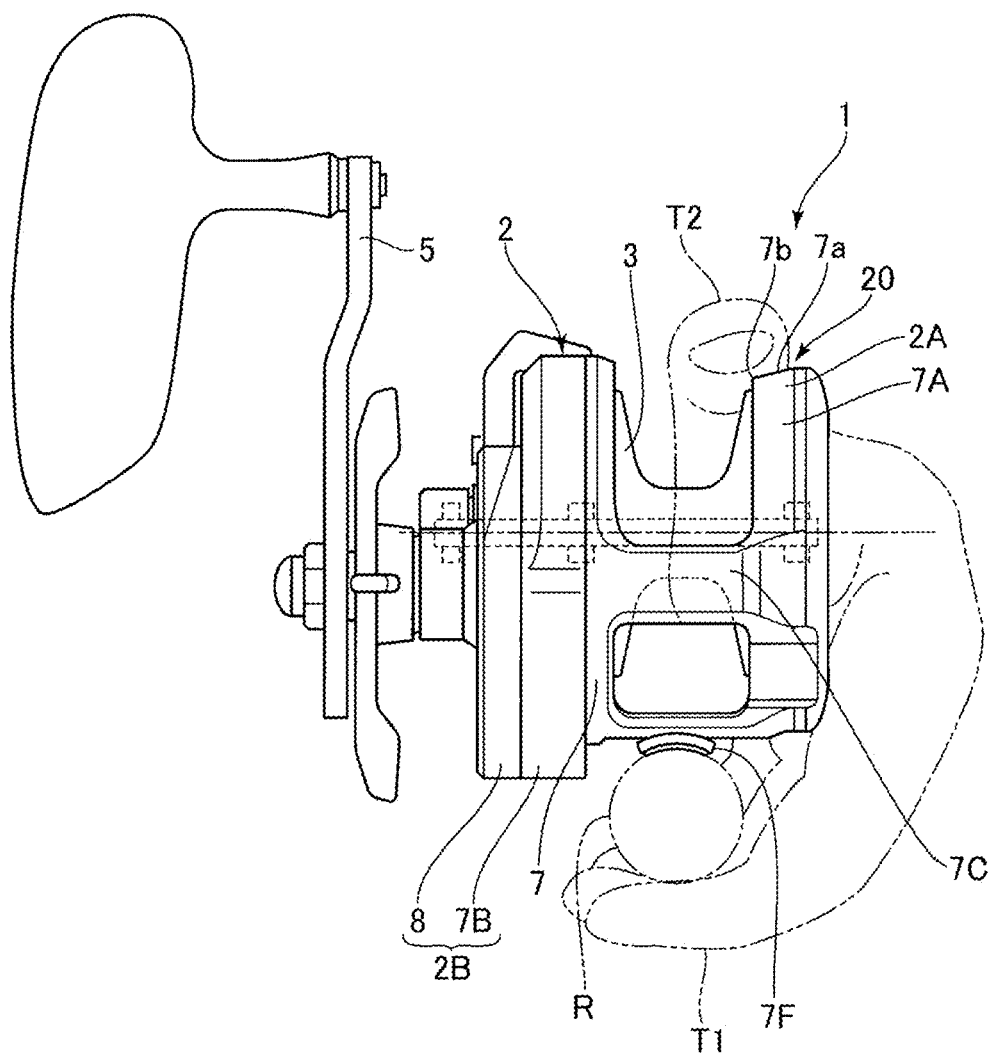
FIG. 1 is a front view of a dual-bearing reel according to an embodiment of the present disclosure with a counter handle-side side panel being hold.

With reference to FIGS. 1 to 5, a description is hereinafter provided of dual-bearing reels according to an embodiment of the present disclosure.

A dual-bearing reel 1 according to the present embodiment is configured to be most suitable for jigging, and its reel body 2 includes a left side panel 2A, a right side panel 2B, and a spool 3 rotatably supported between the side panels 2A and 2B. In the present embodiment, a handle 5 is provided at the right side panel 2B. Operating the handle 5 for winding rotates the spool 3 via a publicly known power transmission mechanism disposed in the right side panel 2B.

The reel body 2 includes a frame 7 that includes the left and right side panels 2A and 2B. The frame 7 is formed as a single body made of, for example, a metal material such as an aluminum alloy and includes a left frame body 7A that is substantially circular in side view and a right frame body 7B that is substantially circular in side view. The left frame body 7A serves as the left side panel (counter handle-side side panel) 2A, and the right frame body 7B forms the right side panel 2B with a cover 8 fitted on the right frame body 7B. In this case, the counter handle-side side panel 2A (left frame body 7A) is formed smaller than the handle-side side panel 2B, which houses the power transmission mechanism, thus improving hold sustainably and making the reel body 2 smaller.

The frame 7 structurally includes connecting parts connecting the left side panel 2A (left frame body 7A) and the right frame body 7B. In the present embodiment, a front connecting part 7C is provided in front of the spool 3, a rear connecting part 7D is provided behind the spool 3, and two lower connecting parts 7E are provided below and adjacent to the spool 3. These connecting parts are formed integrally with the left side panel 2A and the right frame body 7B. The lower connecting parts 7E are fitted with a reel leg 7F (which may be formed integrally with the frame 7) that is to be fitted to a reel seat of a fishing rod R.

The left side panel 2A of the frame 7 is formed substantially circular in side view as described above and is a solid structure having a reduced thickness. As FIGS. 1 and 5 illustrate, the left side panel 2A is configured to enable the reel body 2 to be held together with the fishing rod R when an outer peripheral surface (circumferential surface) 7a is pressed from above by a pad of a thumb T2 of a left hand with an index finger T1 of the left hand hooked around the fishing rod R.

Figure 5:
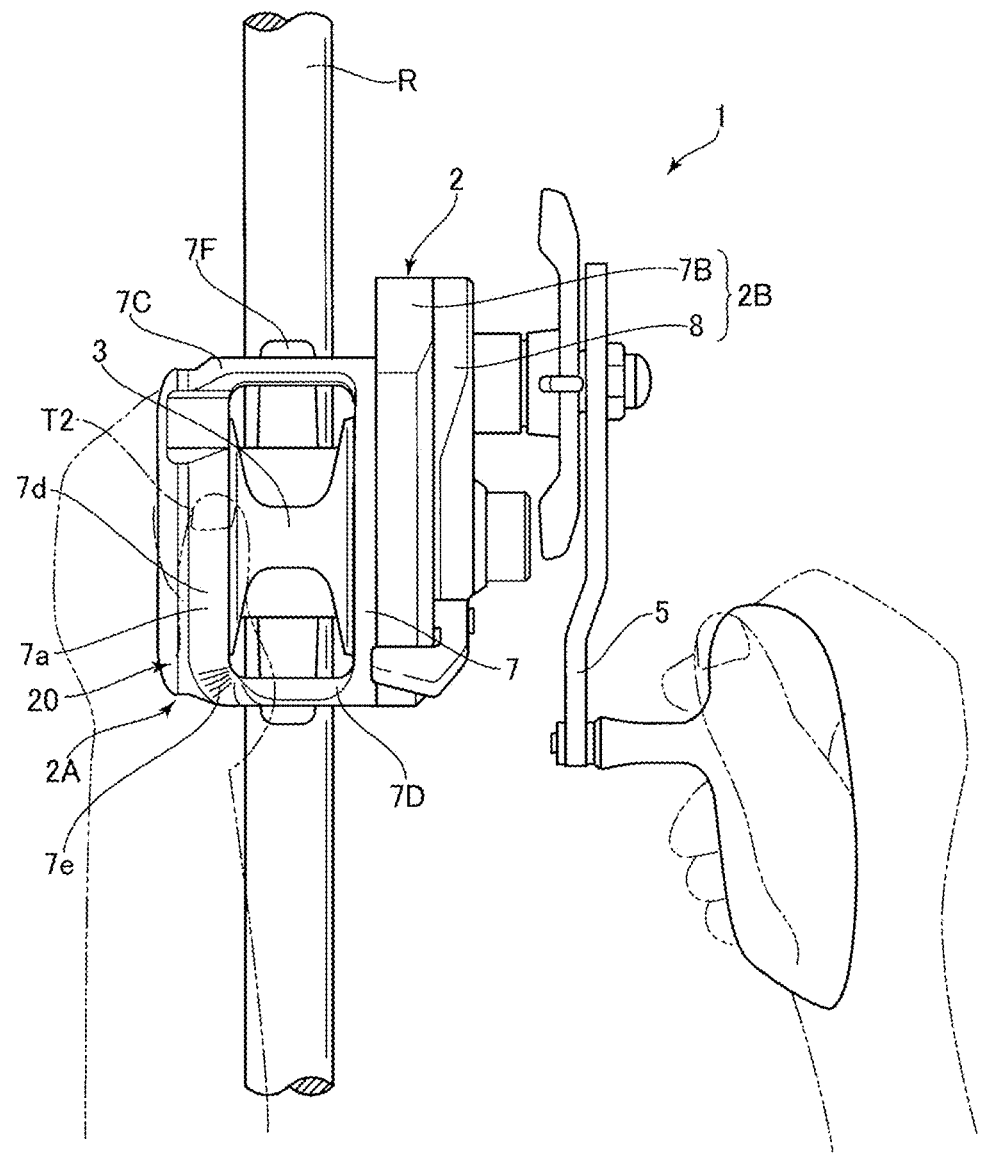
FIG. 5 is a top plan view of the FIG. 1 dual-bearing reel in a held state.

In other words, with the configuration according to the present embodiment, as illustrated in FIG. 5, the left hand does not abut against an outer face of the left side panel 2A at its entire palm (the reel body 2 is not held with the palm). Thus, if the pressing thumb T2 easily slips, there will be a deteriorated hold on the reel body 2. Therefore, a movement restraining portion 20 is provided to prevent the thumb T2 pressing the outer peripheral surface 7a of the left side panel 2A from moving outward from the left side panel 2A, thus enabling a stable hold. A description is hereinafter provided of structure of the movement restraining portion 20 according to the present embodiment.

Figure 3:
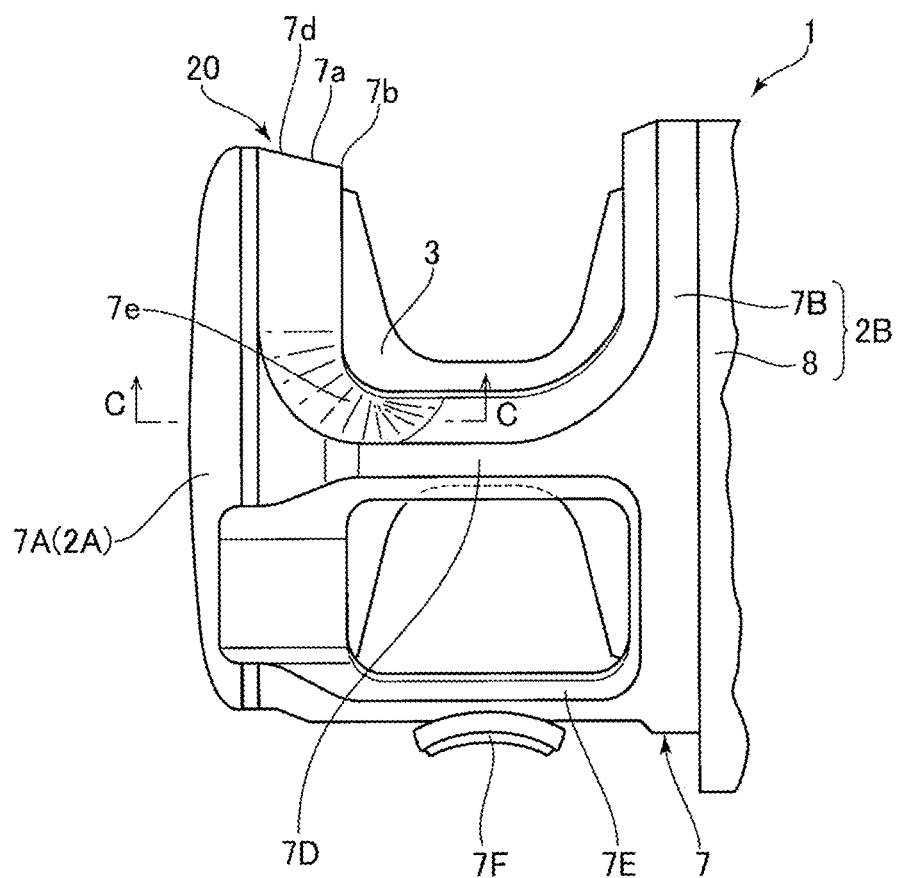
FIG. 3 is a rear view of the dual-bearing reel illustrated in FIG. 1.

As illustrated in FIGS. 1 and 3, the dual-bearing reel 1 according to the present embodiment has an opening (free of a connecting part such as a thumb rest) above the spool 3, which is rotatably supported between the left and right side panels 2A and 2B. In this configuration, the movement restraining portion 20 is formed directly on the outer peripheral surface 7a of the counter handle-side (left) side panel 2A. Therefore, according to the structure of the reel body 2 according to the present embodiment, when the frame 7 is formed, the integral movement restraining portion 20 can be formed integrally by machining an upper portion of the outer peripheral surface 7a of the left side panel 2A into a predetermined shape described below.

The movement restraining portion 20 may be of any structure that prevents a thumb pressing the outer peripheral surface 7a of the left side panel 2A from above from slipping outward and is provided as an inclined portion 7d in the present embodiment. As FIGS. 1 and 5 illustrate, the frame 7 is formed to increase in dimension radially outward from its spool-side outer peripheral edge 7b, which defines the opening above the spool 3, toward its counter spool-side outer peripheral edge, thus forming the inclined portion 7d. This inclined portion 7d is easy to form during the frame formation, and during fishing, the inclination makes it difficult for the pressing thumb T2 to move axially outward while not causing the thumb T2 to feel a sense of discomfort with the press. Even when winding is performed using the handle 5 while strenuous jigging, a stably sustained hold is obtained.

When the inclined portion 7d, which serves as the movement restraining portion 20, is formed directly on the outer peripheral surface 7a of the left side panel 2A, the inclined portion 7d may be formed to extend along the whole periphery of the outer peripheral surface 7a; however, the inclined portion 7d should be formed at least in an area that a pad of a holding thumb presses. Specifically, the inclined portion 7d is formed within an axial width A of the left side panel 2A (that is great enough to allow the pad of the thumb T2 to touch when the thumb T2 presses the left side panel 2A from above) and is formed to rise from the outer peripheral edge 7b. However, regarding a width B and an inclination angle α of the inclined portion 7d, an anti-slip property (a sustained hold using a thumb during jerking) and reeling maneuverability (which encompasses holdability, an operational feeling, ease of gripping when the reel body 2 is held together with a fishing rod, size, weight perception, and others) need to be considered.

Too small or too large an axial width A of the left side panel 2A will deteriorate holdability and maneuverability. If the axial width A is too large, there will also be an increase in weight. No consideration to a ratio (B/A) of the width B of the inclined portion 7d to the width A will deteriorate holdability, maneuverability, and result in a sense of discomfort. Moreover, if the inclined portion 7d forms too large an angle (inclination angle α rising with respect to an axial direction X parallel to a spool shaft), the side panel 2A itself will have a larger diameter and abut hard against a pad of a thumb, thus resulting in deteriorated holdability and maneuverability. Too small an inclination angle α, on the other hand, will result in insufficient anti-slip effect.

Therefore, sensory tests were conducted on a plurality of prepared sample reels to determine inclination angles α of the inclined portion 7d and ratios of the (axial) width B of the inclined portion 7d (extending outward from the spool-side outer peripheral edge 7b of the outer peripheral surface 7a) to the width A of the left side panel 2A that result in satisfactory anti-slip properties and reeling maneuverabilities. In each of the sample reels, the inclined portion 7d, which served as the movement restraining portion 20, is formed directly on the outer peripheral surface 7a of the left side panel 2A.

The plurality of sample reels prepared for the sensory tests had the counter handle-side side panels 2A that were circular and smaller in diameter as in the drawings. Five panelists evaluated grip performances (the anti-slip property and the reeling maneuverability) of each of the sample reels when holding the counter handle-side side panel 2A together with a grip end of the fishing rod R in one hand as in FIG. 1. The evaluation was done on a scale of three levels: ○ (good=3 points), Δ (no particular problem when using=2 points), and × (somewhat concerned when using=1 point). If the five panelists had a total score of 12 to 15 points, ○ was entered in evaluation tables illustrated in FIGS. 6 and 7. If the total score was 8 to 11 points, Δ was entered. If the total score was 5 to 7 points, × was entered.

Figure 2:
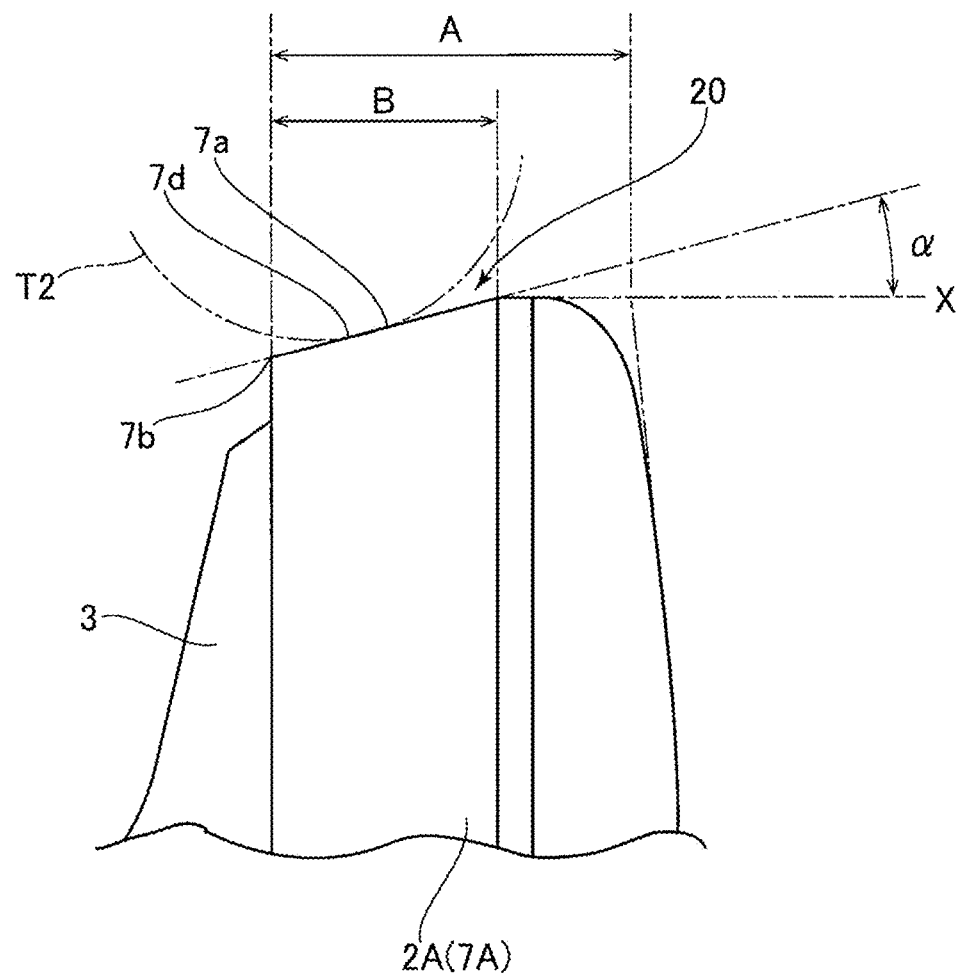
FIG. 2 illustrates a principal part (which is a portion of an outer peripheral surface of the counter handle-side side panel) in FIG. 1.

The plurality of prepared sample reels had varying FIG. 2 ratios B/A (varying width proportions of the inclined portion 7d formed on the outer peripheral surfaces 7a of their counter handle-side (left) side panels 2A) and varying inclination angles α. Other conditions of the sample reel preparation, such as the whole width A of the counter handle-side side panel 2A, the spool 3, a frame body, the handle-side side panel 2B, and the drive mechanism, were the same.

Figure 6:
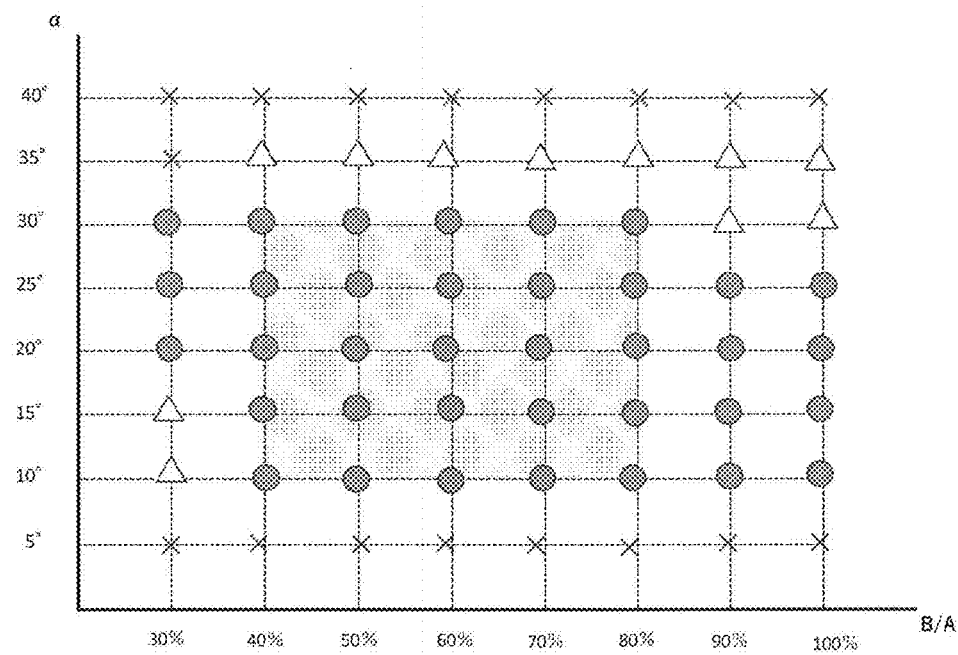
FIG. 6 is a table showing results of a sensory test conducted on dual-bearing reels according to the first embodiment of the present disclosure (for evaluation of their anti-slip properties)
Figure 7:
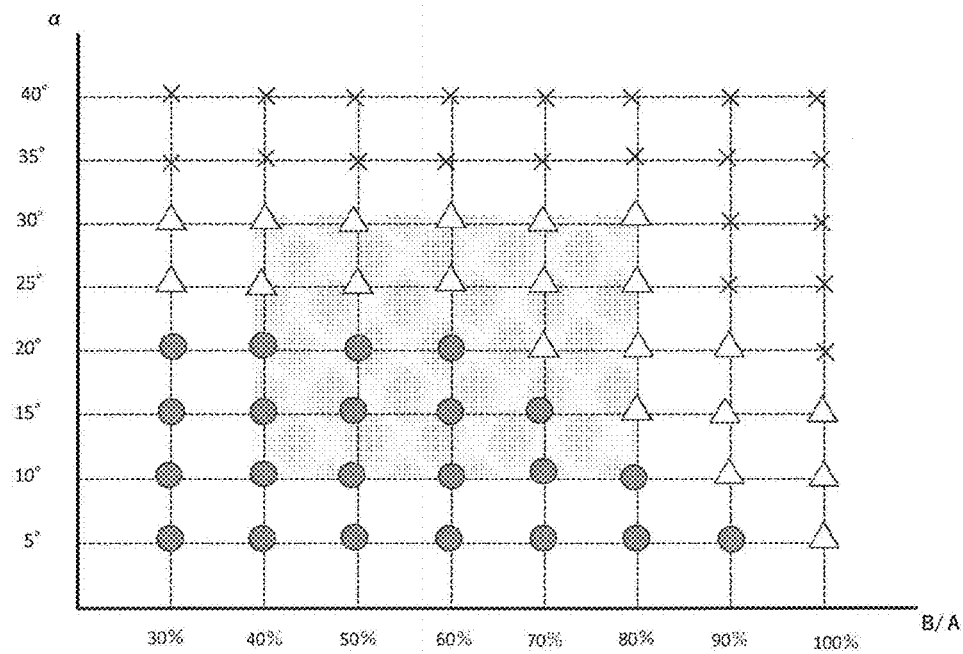
FIG. 7 is a table showing results of a sensory test conducted on the dual-bearing reels according to the first embodiment of the present disclosure (for evaluation of their reeling maneuverabilities)

FIG. 6 is the table showing results of the evaluation of the anti-slip property (the sustained hold using a thumb during jerking). FIG. 7 is the table showing results of the evaluation of the reeling maneuverability (which includes the holdability and the operational feeling) when the handle 5 was operated for winding with the reel body 2 held. As these evaluation results show, slippages were observed when the inclination angle α was as small as 5° (see FIG. 6), while there were improved anti-slip effects (see FIG. 6) and generally satisfactory reeling maneuverabilities (see FIG. 7) when the inclination angle α was set to 10°. Regarding the upper limit for the inclination angle α, it is considered that larger inclination angle α results in an enhanced anti-slip effect, but too large inclination angle α will result in a stronger sense of discomfort in a holding thumb during jerking. According to the evaluation results in FIG. 6, setting the upper limit to 35° or less is preferable. However, given the reeling maneuverabilities (see FIG. 7), it is conceivable that the upper limit is preferably set in a range of 25° to 30°, and more preferably to 20° or less.

Consequently, the inclination angle α is preferably formed to be within a range of 10° to 30° and more preferably of 10° to 20° in order to make it difficult for a pad of a thumb to slip outward.

The proportion (B/A) of the inclined portion 7d to the whole width A is related to the above-described inclination angle α. With the inclination angle α specified in a range of 10° to 30° as described above, the proportion (B/A) is preferably 30% or more and more preferably 40% or more. An upper limit of 90% for the proportion (B/A) is problematic in terms of size and weight perception when the inclination angle α is equal to or larger than 25° (see FIG. 7). Therefore, the upper limit for the proportion (B/A) is preferably set to 80% or less.

Consequently, the obtained result indicates that the inclined portion 7d is preferably formed such that the proportion (B/A) of the inclined portion 7d to the whole width A is in a range of 30% to 80%, and more preferably formed such that the proportion (B/A) is in a range of 40% to 80%. If jigging is to be performed, a dual-bearing reel configured to have the inclination angle α in the range of 10° to 20° and the proportion (B/A) in the range of 40% to 70% in particular will conceivably be more preferable with respect to both the anti-slip property and the reeling maneuverability.

The present disclosure makes it difficult for a thumb that holds the counter handle-side side panel 2A to be displaced. Therefore, when the reel body 2 is to be a frame structure integrally formed of, for example, a metal material such as an aluminum alloy, it is preferable to integrally form a structure that enhances the function of the movement restraining portion 20 on the left side panel side of the rear connecting part 7D behind the spool 3.

Figure 4:
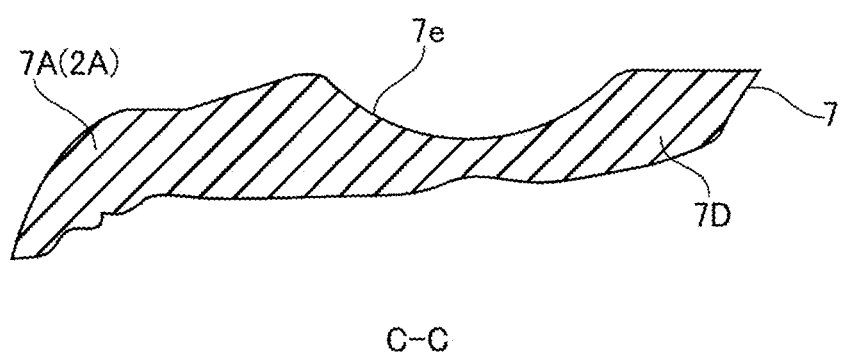
FIG. 4 is a sectional view taken along line C-C in FIG. 3.

For example, as FIGS. 3 and 4 illustrate, a recess 7e that is formed continuously with the movement restraining portion 20 (inclined portion 7d) on the left side panel side of the rear connecting part 7D allows a palm side of a base of a thumb that holds as in FIG. 5 to fit in and more advantageously abut, thus enabling a more sustained hold. By forming the recess 7e continuously with an upper face to extend to a rear face of the rear connecting part 7D, a more stable hold without causing a sense of discomfort in the base of the thumb is achieved.

The movement restraining portion 20 according to the above-described embodiment is the inclined portion 7d that linearly rises axially outward. However, any appropriately modified movement restraining portion is possible as long as a movement restraining portion is provided on an outer peripheral surface of a side panel where a thumb of a hand holding also a fishing rod presses, prevents the thumb from moving outward during jerking or when winding using a handle is performed during jerking, and provides good reeling maneuverability.

Figure 8:
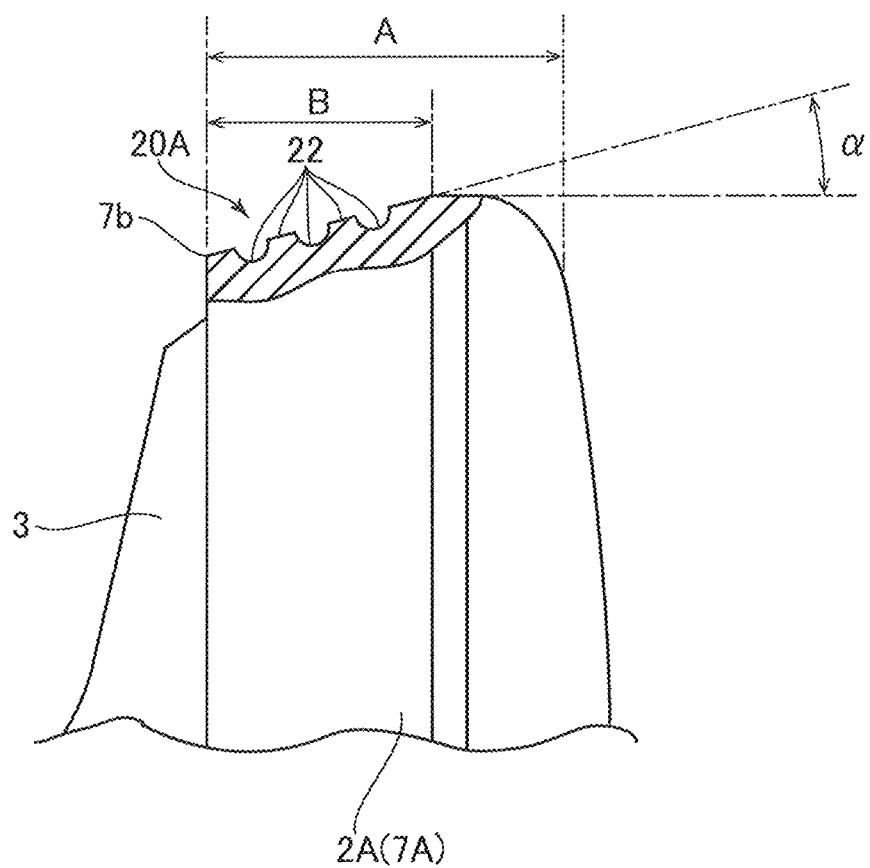
FIG. 8 illustrates a first variation of the movement restraining portion.

FIG. 8 illustrates a first variation of the movement restraining portion provided on the outer peripheral surface 7a of the counter handle-side side panel 2A. The restraining portion 20A of the present variation is configured by forming a plurality of axially contiguous irregularities 22 on the outer peripheral surface 7a of the side panel where a thumb presses. These irregularities 22 may be formed on a surface that is inclined as in FIG. 2 or on a surface that is not inclined. In particular, when the inclined portion is formed to have an inclination angle α in the range of 10° to 30° and to make the proportion (B/A) of the inclined portion to the whole width A in the range of 30% to 80% as in the above-described embodiment, and the irregularities 22 are formed, a resulting dual-bearing reel provides further improved anti-slip property and further improved reeling maneuverability.

Figure 9:
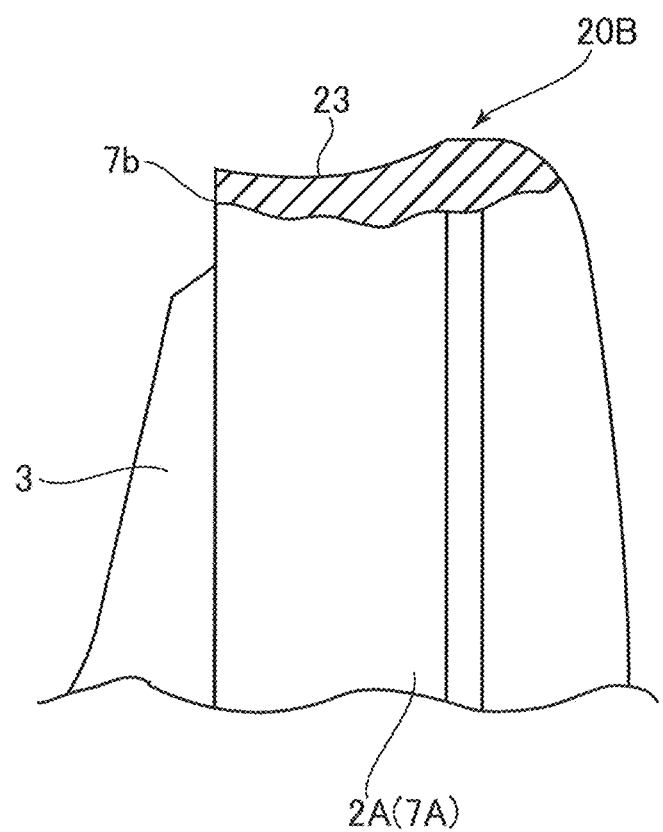
FIG. 9 illustrates a second variation of the movement restraining portion.

FIG. 9 illustrates a movement restraining portion according to a second variation provided on the outer peripheral surface 7a of the counter handle-side side panel 2A. The movement restraining portion 20B according to the present variation is configured by forming a recess 23 in the outer peripheral surface 7a of the side panel where a thumb presses. Such a recess 23 is preferably of a shape that curves along a pad of a pressing thumb. This enables the thumb to advantageously fit in, and a resulting dual-bearing reel will provide a good anti-slip property and good reeling maneuverability. In this configuration, the irregularities 22 illustrated in FIG. 8 may also be formed.

The above-described embodiment according to the present disclosure is not restrictive of the present disclosure, and various modifications may be made in the present disclosure. For example, while the above-described configuration has the handle 5 at the right side panel 2B, the handle 5 may be installed at the left side panel 2A. The frame 7 may be of any structure. The counter handle-side side panel 2A may have a cover as with the right side panel 2B. The side panels 2A and 2B may be appropriately changed in shape. For example, the side panels 2A and 2B may be noncircular.

While each of the above-described movement restraining portions 20, 20A, and 20B is formed directly on the outer peripheral surface 7a of the side panel 2A (frame 7), each of the movement restraining portions 20, 20A, and 20B may be formed, for example, on a member that is separate from the frame 7 and is fixed to the outer peripheral surface 7a of the side panel 2A as long as each of the movement restraining portions 20, 20A, and 20B is provided above the outer peripheral surface 7a of the side panel 2A and within the width A of the side panel 2A. The member may be a thumb rest, a control case including a display unit that displays how much of a fishline has been drawn, or the like. Even when each of the movement restraining portions 20, 20A, and 20B is formed on a side panel of the member that is separate from the side panel 2A, a stably sustained hold is possible, meaning that a pad of a pressing thumb is prevented from slipping outward.

What is claimed is:

1. A dual-bearing reel that enables a rotatably supported spool between a left side panel and a right side panel of a reel body to be rotated with a handle provided at one of the left and right side panels, the dual-bearing reel comprising:
    a movement restraining portion that is provided on an outer peripheral surface of a counter handle-side one of the left and right side panels of the reel body, and that is configured to prevent a pressing thumb of a hand from moving outward from the counter handle-side one of the left and right side panels, wherein a recess is formed continuously with the movement restraining portion on the left side panel side of a rear connecting part behind the spool.

2. The dual-bearing reel according to claim 1, wherein the movement restraining portion is provided on the outer peripheral surface of the counter handle-side one of the left and right side panels near an opening above the spool.

3. The dual-bearing reel according to claim 1, wherein the movement restraining portion is an inclined portion that increases in dimension radially outward from a spool-side outer peripheral edge of the counter handle-side one of the left and right side panels toward a counter spool-side outer peripheral edge of the counter handle-side one of the left and right side panels.

4. The dual-bearing reel according to claim 3, wherein the movement restraining portion is formed on a part of the counter handle-side one of the left and right side panels, the part ranging 30% to 80% of the whole width of the counter handle-side one, and is formed to make an angle of 10° to 30° with a reference line parallel to an axis of a spool shaft.

5. The dual-bearing reel according to claim 1, wherein the movement restraining portion is integrally formed with the counter handle-side one of the left and right side panels.

6. The dual-bearing reel according to claim 1, wherein the counter handle-side one of the left and right side panels is formed smaller in outside diameter than a handle-side one of the left and right side panels.

* * * * *